United States Patent Office 3,564,010
Patented Feb. 16, 1971

3,564,010
GUANIDINO UREIDO AND THIOUREIDO-Δ¹-PYRROLINES
Hermann Bretschneider, Rudolf Franzmair, Wilhelm Klotzer, and Bela Schmidt, Innsbruck, Austria, assignors to Hoffmann-La Roche Inc., Nutley, N.J., a corporation of New Jersey
No Drawing. Filed Feb. 23, 1968, Ser. No. 707,484
Claims priority, application Switzerland, Feb. 27, 1967, 2,905/67
Int. Cl. C07d 27/14
U.S. Cl. 260—326.3        21 Claims

ABSTRACT OF THE DISCLOSURE

Guanidino or ureido or thioureido pyrrolines (A) prepared from 2-amino-Δ¹-pyrrolines (B). Both (A) and (B) lower the blood sugar content in warm blooded animals; hence, are useful as hypoglycemic agents.

DETAILED DESCRIPTION OF THE PRESENT INVENTION

The present invention relates to novel pyrroline derivatives. More particularly, it relates to pyrroline derivatives of the general formula (I)

wherein $R^1$ is phenyl or phenyl substituted by lower alkyl, lower alkoxy or halogen; $R^2$ is lower cycloalkyl, lower cycloalkenyl, phenyl or phenyl substituted by lower alkyl, lower alkoxy or halogen; $R^3$, $R^4$, $R^5$, $R^6$ and $R^8$ are, individually, hydrogen or lower alkyl; $R^7$ is hydrogen, lower alkyl, lower carbalkoxy-lower alkyl, di-lower alkylamino-lower alkyl, lower alkoxy phenyl or lower alkoxy-lower alkyl; and X is oxo, thioxo or imino, H-tautomers thereof and the corresponding acid additions salts.

The H-tautomers of the compounds of Formula I can be represented by the following formulae:

(Ia)        (Ib)

wherein $R^1$ and $R^8$ and X are as above.

By the term "lower alkyl" as utilized herein either alone or in conjunction with another radical (e.g. lower alkyl phenyl) both straight or branched chain hydrocarbon groups containing 1 to 7 carbon atoms in the chain are intended, such as methyl, ethyl, propyl, isopropyl, butyl, pentyl, hexyl and the like. Preferred among the lower cycloalkyl or cycloalkenyl groups are those which contain 4 to 7, particularly 5 or 6 carbon atoms, such as cyclopentyl, cyclohexyl, cyclopentenyl and cyclohexenyl. The expression lower alkoxy-lower alkyl as found herein represents, for example, a methyl, ethyl or propyl group substituted by a methoxy, ethoxy or propoxy group, such as methoxymethyl or methoxyethyl and the like. By the term "halogen" as utilized herein, there is intended all four forms thereof, i.e., chlorine, fluorine, bromine and iodine. A lower alkyl phenyl group can be represented by para-methyl phenyl. A halophenyl group can be represented by para-chlorophenyl. A lower alkoxy phenyl group can be represented by para-methoxyphenyl.

Exemplary carbalkoxy-lower alkyl groups are carbethoxymethyl, carbethoxyethyl and carbethoxypropyl. Exemplary di-lower alkylamino-lower alkyl groups are dimethylamino- and diethylamino-ethyl, -propyl andbutyl.

Especially preferred for the purposes of the present invention are compounds of the Formula I above or the H-tautomers thereof of the Formulas Ia or Ib above in which $R^1$ and $R^2$ each represent a phenyl group and $R^3$, $R^4$, $R^5$, $R^6$, $R^7$ and $R^8$ represent hydrogen and lower alkyl, preferentially methyl or ethyl.

Compounds of the Formula I above (or the H-tautomers thereof) as well as the corresponding acid addition salts are prepared by introducing a $$-\underset{\overset{\parallel}{X}}{C}-NR^7R^8$$

grouping wherein X, $R^7$ and $R^8$ are as above into a compound of the formula (II)

wherein $R^1$, $R^2$, $R^3$, $R^4$, $R^5$ and $R^6$ are as above or an H-tautomer of a compound of the Formula II, and if desired, forming an acid addition salt of such compounds by conventional techniques.

The H-tautomers of the 2-amino-Δ¹-pyrroline compounds of the Formula II above can be structurally identified as 2-iminopyrrolidines and are of the formula (IIa)

wherein $R^1$, $R^2$, $R^3$, $R^4$, $R^5$ and $R^6$ are as above.

The introduction of the amidino grouping (X=NH) or of the carbamoyl group (X=O) into the 2-imino or the 2-amino compound of the Formula II above can be effected according to conventional procedures for effecting amidination or carbamoylation.

In a preferred method for effecting the above-mentioned amidination, i.e. the transformation of the imino group of the Formula IIa above or the amino group of the compound of the Formula II above into a guanidino group, there is utilized as reagents an acid addition salt of an S-lower alkyl-isothiourea or an O-lower alkyl isourea (preferably with the hydrochloride of S-methylisothiourea or O-methyl-isourea).

Such reaction is carried out by contacting the compound of the Formula II above or the T-tautomer thereof with the isothiourea or isourea reagent, preferably in the presence of an organic solvent, the choice of which depends primarily on the solubility of the reactants. As the organic solvent, there can be utilized non-polar organic solvents such as aromatic hydrocarbons, e.g. benzene, toluene and xylene, halogenated aromatic hydrocarbons, such as chlorobenzene, ethers such as tetrahydrofuran or dialkyl ethers, e.g. diethyl ether, N,N-di-lower alkylamides, such as N,N-dimethylformamide. Furthermore, dimethylsulphoxide or lower alkanols such as isopropanol may also be efficaciously utilized as the solvent medium. The reaction can be carried out at room temperature, or if necessary, at an elevated temperature, for example, on the steam bath or at the boiling temperature of the solvent.

In yet another embodiment of the present invention, a compound of the Formula II or of the Formula IIa above is reacted with cyanamide whereby to prepare the corresponding compound of the Formula I or Ia or Ib above wherein X is NH. For example, a mixture of the cyanamide compound with the compound of the Formula II or IIa above, preferably utilized in the form of a salt thereof (particularly, a mineral acid addition salt, e.g. hydrochloride, hydrobromide, sulfate and the like) is heated to form a melt, which is then dissolved in a suitable solvent such as a lower alkanoic acid, e.g. acetic acid and the like, and the desired product is isolated. The reaction may also be performed in the presence of a suitable solvent such as a lower alkanol, e.g. ethanol and the like.

Another route for preparing the compounds of the Formula I or the H-tautomers thereof comprises reacting a compound of the Formula II or IIa above with a 1-amidino-pyrazole or a salt thereof. The pyrazole nucleus of such reagent may contain additional substituents, particularly, lower alkyl, e.g. methyl, ethyl and the like. Particularly preferred are 3,5 - dimethyl - (1) - amidinopyrazole or its hydrochloride or 3,5 - dimethyl-(1)-nitroamidinopyrazole. The reaction may be carried out in the absence of a solvent or in the presence of a diluent such as, for example, a lower alkanol, e.g. ethanol and the like. The reaction mixture is preferably heated, for example, to the melting point of the mixture or to the boiling point of the solvent.

When using 3,5 - dimethyl - (1) - nitroamidinopyrazole, the nitroguanidino derivative which is first obtained is converted into the guanidino derivative by reduction, e.g. by catalytic hydrogenation.

In yet another process aspect of the invention, it has been surprisingly found that an amidino group can be introduced by reaction of the starting compounds of the Formula II and IIa above with bis-benzhydryl-carbodiimide and thereafter cleaving the benzhydryl group from the N,N - bis - benzhydryl - guanidinopyrroline thus obtained utilizing, for example, hydrogen bromide in formic acid.

Compounds of the Formula I above or the H-tautomers thereof can also be prepared by treating a solution of a compound of the Formula II above or an H-tautomer thereof with a cyanogen halide, e.g. cyanogen bromide and the like, preferably in the presence of a hydrogen halide binding agent (e.g. an alkali hydroxide or carbonate) and an inert organic solvent such as, for example, chloroform and the like. The cyano derivative thus obtained is thereupon hydrated to the carbamoyl derivative, i.e. to a compound of the Formula I or an H-tautomer thereof wherein X is O, with a solution of hydrochloric acid in a lower alkanol, e.g. ethanol, isopropanol and the like or with 6 N aqueous hydrochloric acid.

When treating a compound of the Formula II above (or an H-tautomer thereof) with cyanogen bromide, there can result two isomeric reaction products depending upon whether the cyano group is attached to the ring N-atom ($N_1$) or at the amino group in the 2-position ($N_2$). Thus, for example, when reacting a solution of 2-amino-3,3 - diphenyl - 5 - methyl - $\Delta^1$ - pyrroline in chloroform with cyanogen bromide in the presence of $K_2CO_3$ water there results two isomeric cyano derivatives which may be separated readily because of their differing solubilities in dilute hydrochloric acid. One isomer is insoluble in the acid while the other is soluble thereby permitting ready separation of the two isomers by a conveniently available conventional technique.

In yet another process modification of the present invention, a compound of the Formula I above wherein X is NH can be hydrolyzed to the corresponding compound of the Formula I above wherein X is oxygen by treating the first-mentioned compound wherein X is NH with a hydrogen bromide-formic acid solution. This hydrolysis is particularly efficacious with compounds of the Formula I above wherein $R^7$ and $R^8$ is hydrogen. It has been observed that when performing the said hydrolysis wherein $R^7$ and $R^8$ are hydrogen, a correspondingly substituted pyrrolidone-(2) is obtained as a by-product.

Compounds of the Formula I and the H-tautomers thereof wherein X is S (i.e. thiocarbamidino compounds) can, for example, be obtained via the reaction of a compound of the Formula II above or an H-tautomer thereof with a cyanogen halide such as cyanogen bromide in the manner described above and treating the so-obtained 2-cyanamido derivative which results with hydrogen sulfide or a thiophosphoric acid ester (e.g. with a dithiophosphoric acid O,O-dialkyl ester). If substituted thiocarbamidino groups are desired, they can advantageously be provided via the reaction of a lower alkyl, a lower carbalkoxy-lower alkyl, a di-lower alkylamino-lower alkyl, a lower alkoxy phenyl or a lower alkoxy lower alkyl isothiocyanate and a compound of the Formulae II or IIa above, conveniently at room temperature in the presence of an inert solvent, whereby to obtain the corresponding compound of the Formula I above which contains in the 2-position a substituted thiocarbamidino group.

In certain events, e.g. when using methoxymethyl or carbethoxymethyl isothiocyanate, the isothiocyanate is advantageously reacted with a compound of Formula II at room temperature in alcoholic solution, whereupon the reaction product is isolated and subsequently heated in benzene solution.

Another process aspect of the invention involves the preparation of the compounds of the Formula II above or the H-tautomers thereof. Novel compounds of the Formula II above prepared by the technique described hereinafter are those in which, when $R^1$ and $R^2$ designate phenyl and $R^5$ and $R^6$ represent hydrogen, at least one of $R^3$ and $R^4$ connotes a lower alkyl group and when only one $R^3$ or $R^4$ is lower alkyl said lower alkyl contains at least two carbon atoms.

The compounds of the Formulae II or IIa above can be prepared by (a) Treating a compound of the general formula

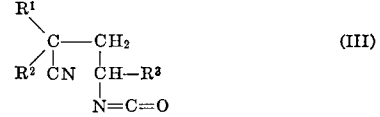

wherein $R^1$, $R^2$ and $R^3$ have the above meaning, with an alkaline agent or (b) Treating a compound of the general formula

wherein $R^1$ and $R^2$ have the above meaning with a reducing agent or (c) Treating a compound of the general formula

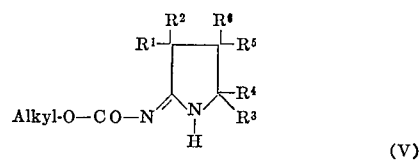

wherein $R^1$ to $R^6$ have the above meaning with an alkaline agent or (d) Treating a compound of the general formula

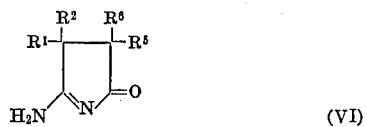  (VI)

wherein $R^1$, $R^2$, $R^5$ and $R^6$ have the above meaning with a reducing agent or (e) Treating a compound of the general formula

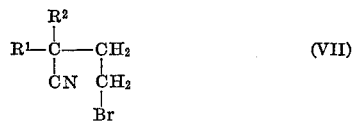  (VII)

wherein $R^1$ and $R^2$ have the above meaning with ammonia.

The compounds of the Formula III above can be obtained utilizing the following preparative technique:

A Mannich base obtained from a malonic acid ester of the formula $R_3CH(COO\text{-lower alkyl})_2$, formaldehyde and dimethylamine is converted into the iodo methylate. The iodo methylate is condensed with an $R^1,R^2$-disubstituted acetonitrile in the presence of sodium ethylate. The resulting condensation product is saponified with alkali hydroxide whereby a carboxylic acid corresponding to the isocyanate of the Formula III above is obtained. The so-obtained acid is transformed into the acid chloride with thionyl chloride. The isocyanate of the Formula III above is obtained from the so-transformed product, i.e. the acid chloride, by the well-known Curtius degradation technique.

Compounds of the Formula III above can be converted into the corresponding compound of the Formula II above by treating the isocyanate obtained as described hereinabove with alkali, for example, with an alkali metal hydroxide such as sodium or potassium hydroxide or an alkaline earth metal hydroxide such as barium hydroxide. Suitably, the reaction is effected at elevated temperatures, i.e. the isocyanate is heated in the presence of an organic solvent such as a lower alkanol, e.g. methanol, and alkali, e.g. an alkali metal hydroxide such as sodium or potassium hydroxide. Procedure (a) above is particularly suitable for the preparation of compounds of the Formula II above or its H-tautomers wherein $R^5$ and $R^6$ and one of $R^3$ and $R^4$ is hydrogen.

A compound of the Formula IV above can be obtained for example by reacting a corresponding aryl ketone with a cyanoacetic acid ester and treating the diarylcyanoacrylic acid ester thus obtained with HCN, then saponifying the resulting product and decarboxylating the so-obtained saponified product by conventional procedures.

A suitable reducing system for converting a compound of the Formula IV above into the corresponding compound of the Formula II above or an H-tautomer thereof includes, for example, hydrogen in the presence of Raney catalysts, such as Raney-cobalt or Raney nickel. Equally efficacious for the purposes of the present invention is a reducing system which includes complex metal hydrides, such as lithium aluminum hydride as the reducing agent. When hydrogen and Raney catalysts comprise a part of the reducing system, the reduction is carried at normal or elevated pressures. It is convenient to reduce the compound of the Formula IV in ammonia in an alcohol, such as methanol or ethanol at elevated temperatures, e.g. at a temperature range from about 50 to about 100° C. and from about 50 to 150 atmospheres of hydrogen. The reduction procedure identified by (b) above is particularly efficacious in preparing compounds of the Formula II above wherein $R^3$, $R^4$, $R^5$ and $R^6$ represent hydrogen and $R^1$ and $R^2$ represent substituted aryl radicals, e.g. lower alkyl phenyl and the like.

The compounds of the Formula V above can be obtained, for example, by reacting an $R^1$, $R^2$-disubstituted acetonitrile wherein $R^1$ and $R^2$ are as above with an alkyl-substituted or dialkyl-substituted N-carbalkoxy-ethylene-imine in the presence of a basic condensation agent such as sodium amide.

The conversion of a compound of the Formula V above into the corresponding compound of the Formula II above can be effected by treating the compound of the Formula V above with an alkali such as an alkali metal hydroxide, e.g. sodium or potassium hydroxide, or an alkaline earth metal hydroxide, such as barium hydroxide. In effecting the conversion of a compound of the Formula V in accordance with process aspect (c) above, a compound of the Formula V is suitably heated in aqueous alcoholic alkali, e.g. ethanolic sodium hydroxide and the like.

This procedure is particularly useful in preparing compounds of the Formula II above in which $R^3$, $R^4$, $R^5$ and $R^6$ represent hydrogen and for the preparation of compounds of the Formula II above which contain alkyl in the 4- or 5-position. The so-obtained alkyl-substituted derivatives, i.e. those substituted in the 4- and 5-position can, if desired, be separated into the individual components by fractional crystallization according to conventional techniques.

The compounds of the Formula VI above can, for example, be obtained by converting a compound of the formula

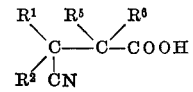

wherein $R^1$, $R^2$, $R^5$ and $R^6$ are as above into its acid chloride according to conventional techniques. The acid chloride when treated with ammonia, yields the corresponding amide. The amide can they be cyclized to a compound of the Formula VI by the action of a suitable base, e.g. sodium hydroxide. Compounds of the Formula VI can be converted into the corresponding compounds of the Formula II utilizing a conveniently available reducing system which preferably includes as the reducing agent, complex metal hydrides such as lithium aluminum hydride. This procedure is particularly efficacious when compounds of the Formula II above in which $R_3$ and $R_4$ are both hydrogen and $R_5$ and $R_6$ represent hydrogen or lower alkyl groups are desired.

The compounds of the general Formula VII can be obtained by reacting a compound of the formula

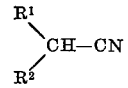

wherein $R^1$ and $R^2$ are as above or an alkali metal salt thereof, e.g. the sodium salt thereof with ethylene bromide in benzene at slightly elevated temperatures, i.e. in the warm. The conversion of the compound of the Formula VII into the corresponding compound of the Formula II can be effected by treatment with liquid ammonia.

The high level of hypoglycemic activity of the compounds of the Formula I and the Formula II above as well as the H-tautomers thereof evidencing their usefulness as antidiabetics has been demonstrated in experimental animals. To evidence this usefulness groups of 5 rats weighing from about 60 to 80 g. are used in order to determine the effect of the compounds of the Formulae I and II above and the H-tautomers thereof on levels of glucose in the blood. Blood is obtained by decapitation and immediately deproteinized [J. Biol. Chem. 160, 69–73 (1945)] 16, 3 and 1 hour after administration of the compound. Oral application of a suspension of the compound in polyethylene glycol (Carbowax 400) is performed by stomach tube. Control rats are given the vehicle alone. Clucose is determine by the Technicon Auto-Analyzer using the enzymatic glucoseoxidase-peroxidase-tolidine procedue [Anal. Biochem. 3, 131 (1962)]. The result from five rats are averaged at each time interval and are reported as percent deviation from control. Results are expressed as percent deviation in the blood glucose value from the control pretreatment value.

The readings are averaged by groups. Percent deviation from controls are calcuated by the following formula Percent deviation from controls $$= \frac{1, 3 \text{ or } 16 \text{ hour mg. percent average} - \text{control mg. percent average}}{\text{control mg. percent average}} \times 100$$

If the 1, 3 or 16 hour average is greater than the controls, the result is a positive percentage. If the control average is higher, the result is a negative percentage. The significance of results is calculated by a computer program. Results are expressed as percent deviation from control [numerical value proceeded by (+) or (−)].

As is evident from the above, the compounds of the Formulate I and II and the H-tautomers thereof are hypoglycemically active compounds and, accordingly, can be used as antidiabetic agents. They may be incorporated in a pharmaceutical formulation according to conventional techniques so that the drug will be present in the formulation in an amount from about 50 to about 100 mg., compounded into conventional pharmaceutical dosage forms which contain the active ingredients or their salts in admixture with a pharmaceutically suitable organic or inorganic inert carrier matreial. Representative of such inert carrier materials are water, gelatin, lactose, starches, magnesium stearate, talc, etc. The pharmaceutical dosage formulations can be compounded as tablets, dragees, capsules and the like. They may also contain other therapeutically pharmacologically acitve substances. Most preferred for the purposes of the present invention are compounds of the Formula I, Ia or Ib above wherein $R^1$ and $R^2$ represent the phenyl group, $R^5$ and $R^6$ represent hydrogen and at least one of $R^3$ and $R^4$ represent lower alkyl, most preferentially where one of $R^3$ and $R^4$ is hydrogen and the other is lower alkyl, most preferably, methyl. Additionally preferred for the purposes of the present invention are compounds of the Formula I above wherein $R^7$ and $R^8$ are hydrogen, X is NH or S, $R^1$ and $R^2$ are phenyl, $R^5$ and $R^6$ are hydrogen and at least one of $R^3$ and $R^4$ is lower alkyl, most preferably one of $R^3$ and $R^4$ is hydrogen and the other is lower alkyl, most preferentially methyl. Examples of preferred compounds are given below:

2-thioureido-3,3-diphenyl-5-$\Delta^1$-pyrroline. At a dose of 309 mg./kg., the compound gives −6; −12 and −20 percent deviation when tested as described above.

2-(N′ - n - butyl)-thioureido - 3,3-diphenyl-5-methyl-$\Delta^1$-pyrroline. At a dose of 401 mg./kg. the compound gives +5; −15 and −37 percent when tested as above.

2-(N′ - methoxymethyl) - thioureido - 3,3-diphenyl-5-methyl-$\Delta^1$-pyrroline. At a dose of 353 mg./kg. the compound gives +1; −5 and −21 percent when tested as described above.

2-guanidino-3,3 - diphenyl-5-methyl - $\Delta^1$ - pyrroline. At a dose of 165 mg./kg. the compound gives −7; −17 and −17 percent when tested as above.

The following examples are illustrative but not limitative of the invention. Temperatures, unless otherwise stated, are expressed in degrees centigrade.

Example 1

10 g. of S-methylisothiourea hydrochloride in 300 ml. of benzene are, after azeotropic distillation of 100 ml. of the solvent, treated with 3.5 g. of 2-amino-3,3-diphenyl-$\Delta^1$-pyrroline and heated under reflux for 26 hours. After cooling, the mixture is added to 100 ml. of 1 N hydrochloric acid and agitated vigorously. The so-obtained mixtcre is thereafter made alkaline with caustic soda and extracted with acetic ester. The residue which remains after evaporation of the acetic ester is triturated with 40 ml. of acetone/ether (1:1) and filtered with suction. The filtrate is evaporated and the residue treated with 20 ml. of ether. After 24 hours, 2-guanidino-3,3-diphenyl-$\Delta^1$-pyrroline of melting point 188–192° crystallizes (from ethanol and benzene). The hydrochloride which is obtained in accordance with usual techniques melts at 249–250° (from water).

Example 2

8.26 g. of 2-amino-3,3-diphenyl-$\Delta^1$-pyrroline and 13.09 g. of N,N′-bisbenzhydrylcarbodiimide are successively added to 100 ml. of benzene and, with the exclusion of moisture, heated at reflux for 3 hours. After cooling to room temperature, the so-formed mixture is filtered and mixed with 2 N hydrochloric acid for 10 minutes. The precipitate is filtered off by suction and washed three times with ether giving 2-(N,N′-dibenzhydryl-guanidino) 3,3-diphenyl-$\Delta^1$-pyrroline hydrochoride of melting point 256.5–258.5° (after recrystallization from alcohol/water 1:1).

20 g. of this product are dissolved at 20° in 154 ml. of 99–100 percent formic acid and treated with 92.3 ml. of 64 percent aqueous hydrobromic acid. The so-obtained mixture is maintained at 88–92° for one and one-half hours, then cooled and evaporated to dryness in vacuum at 70–80° bath-temperature. The residue is added to 100 ml. of water and the resulting mixture evaporated. The colorless residue is taken up in 800 ml. of water at 50–60°, washed three times at this temperature with 50 ml. of benzene each time and, while still hot, made alkaline with 100 ml. of 10 percent caustic soda. After cooling, filtering with suction and drying, there is obtained 2-guanidino-3,3-diphenyl - $\Delta^1$ - pyrroline of melting point 189–194° which is identical with the product obtained in Example 1.

Example 3

12.5 g. of 2-amino-3,3-diphenyl-5-methyl-$\Delta^1$-pyrroline, 10 g. of S-methylisothiourea hydrochloride and 450 ml. of benzene are heated at reflux for 24 hours with the exclusion of moisture. There is formed in the lower portion of the mixture, a brown, viscous melt while colorless crystals are suspended in the supernatant solution. By decantation, these crystals can be separated from the lower portion and are filtered off. Upon recrystallization from water, there is obtained 2-guanidino-3,3-diphenyl-5-methyl-$\Delta^1$-pyrroline hydrochoride which melts at 268°.

Example 4

1.25 g. of 2-amino-3,3-diphenyl-5-methyl-$\Delta^1$-pyrroline and 1.4 g. of 3,5 - dimethyl-1-amidino-pyrazole hydrochloride are well mixed and heated at 140–145° for 5 hours. During this process, dimethyl - pyrazole sublimes. After cooling, the resultant mixture is treated with 30 ml. of water, 10 ml. of 1 N hydrochloric acid and ether, mixed well and the ether phase is separated. The ether phase is extracted several times with 5 ml. of 1 N hydrochloric acid. The hydrochloric acid extracts are combined with the HCl medium remaining after separation of the ether. Upon concentration to about 15 ml., 2-guanidino-3,3-diphenyl-5-methyl-$\Delta^1$-pyrroline hydrochloride of melting point 260–268° is obtained, which is identical with the compound obtained in Example 3.

Example 5

A cold solution of 4.4 g. of O-methylisourea hydrochloride in 50 ml. of absolute ethanol is added at 0° to a solution of 0.92 g. of sodium in 50 ml. of absolute ethanol. With the exclusion of moisture, the so-obtained mixture is filtered from the precipitated sodium chloride and the filtrate is treated with 2.5 g. of 2-amino-3,3-diphenyl-5-methyl-$\Delta^1$-pyrroline. The resultant mixture is heated to boiling at the descending condenser, whereby the alcohol is for the most part distilled off within 1 hour. The so-obtained medium is heated on the steam bath for six additional hours, then treated with 50 ml. of water, made congo-acid with hydrochloric acid and heated untill all of the acid has dissolved. Then, it is washed twice with ether, made alkaline with 10 percent caustic soda, extracted three times with ether. The ether extract is dried and subsequently evaporated in vacuum. The residual crude base is taken up hot in 3 N hydrochloric acid and, after cooling, yields crystalline 2-guanidino-3,3-diphenyl-5-methyl-$\Delta^1$-pyrroline hydrochloride of melting 262–268° which is identical with the product from Example 3.

Example 6

15 g. of 2 - amino-3,3-diphenyl-5-methyl-$\Delta^1$-pyrroline dissolved in 130 ml. of chloroform, are added to a solution of 9.5 g. of potassium carbonate in 50 ml. of water and treated with stirring at 15–20° with a solution of 9.5 g. of cyanogen bromide in 60 ml. of chloroform. After three hours, an aqueous phase and an organic phase forms. The aqueous phase is removed. The organic phase is washed six times with 20 ml. of 6 N hydrochloric acid each time, then with water, dried and evaporated in vacuum. The residue is taken up in 40 ml. of ethanol, and after addition of 15 ml. of 2 N hydrochloric acid, there is obtained crystalline 2 - cyanamido - 3,3 - diphenyl-5-methyl-$\Delta^1$-pyrroline. Melting point 193–195°.

6 g. of 2-cyanamido-3,3-diphenyl-5-methyl-$\Delta^1$-pyrroline are dissolved in 40 ml. of methanol, saturated with hydrochloric acid gas and allowed to stand at 20° for two hours. After evaporation of the solvent in vacuum, there is obtained 2 - ureido-3,3-diphenyl-5-methyl-$\Delta^1$-pyrroline hydrochloride of melting point 185–190° (from alcohol/ether). The free base of melting point 156–158° is obtained from the aqueous solution of this hydrochloride by means of caustic soda.

Example 7

26.4 g. of 2-amino-3,3-diphenyl-5-ethyl-$\Delta^1$-pyrroline and 20 g. of 1-nitroamidino-3,5-dimethyl-pyrazole are heated at reflux for one and one-half hours in 300 ml. of absolute ethanol. After cooling, the solution is stirred into 2500 ml. of 0.5 N caustic soda, the resulting precipitate is filtered off by suction, washed with water, pulverized and stirred with 500 ml. of 1 N hydrochloric acid for 30 minutes. After filtration by suction, washing with water and drying, there is obtained 2-nitroguanidino-3,3-diphenyl-5-ethyl-$\Delta^1$-pyrroline. Melting point 149–151° (from alcohol/water).

30 g. of 2-nitroguanidino-3,3-diphenyl-5-ethyl-$\Delta^1$-pyrroline are hydrogenolyzed in 1500 ml. of glacial acetic with 3 g. of palladium carbon under usual conditions. After 20 hours the catalyst is renewed and the resultant mixture further hydrogenated up to the standstill of the hydrogen uptake. After removal of the catalyst and evaporation in vacuum, a syrup is obtained which is dissolved in water, filtered, made alkaline with 1 N caustic soda and extracted with acetic ester. After washing, drying and evaporating in vacuum there is obtained a foam which is dissolved in alcohol. The alcohol medium is adjusted to pH 3 with 4 N ethanolic hydrochloric acid. The resultant mixture is again evaporated to dryness, acetone is added and the resultant acetone mixture evaporated (two times). The residue is crystallized from acetone giving 2 - guanidino-3,3-diphenyl-5-ethyl-$\Delta^1$-pyrroline hydrochloride which melts at 208–210° (from alcohol/ether).

Example 8

In a similar manner as that described in Example 7, from 2-amino-3,3-diphenyl-5-butyl-$\Delta^1$-pyrroline there is obtained 2 - nitroguanidino-3,3 - diphenyl-5-butyl-$\Delta^1$-pyrroline, melting point 149–151° (from alcohol).

16 g. of 2 - nitroguanidino - 3,3 - diphenyl-5-butyl-$\Delta^1$-pyrroline are dissolved in 200 ml. of dimethylformamide and 30.5 ml. of 3 N hydrochloric acid. The resultant mixture is hydrogenolyzed in the presence of 2 g. of palladium-carbon until the hydrogen uptake has ended. The mixture is filtered from the catalyst and evaporated in vacuum at 75° bath temperature. The residue is dissolved in 100 ml. of water and 2-guanidino-3,3-diphenyl-5-butyl-$\Delta^1$-pyrroline hydrochloride is isolated in the manner described in Example 7. M.P. 137–139° (from acetic ester).

Example 9

As in Example 7, from 2-amino-3,3-diphenyl-5-isobutyl-$\Delta^1$-pyrroline, there is obtained 2-nitroguanidino-3,3-diphenyl-5-isobutyl-$\Delta^1$-pyrroline of melting point 126–128° (from alcohol). This is hydrogenolyzed as set out in Example 8 to give 2-guanidino-3,3-diphenyl-5-isobutyl-$\Delta^1$-pyrroline hydrochloride. Melting point 124° (dec.) (from acetic ester/petroleum ether).

Example 10

2 - amino - 3,3 - diphenyl-5-hexyl-$\Delta^1$-pyrroline is converted as in Example 7 into 2 - nitroguanidino-3,3-diphenyl - 5 - hexyl-$\Delta^1$-pyrroline which melts at 142–144° (from alcohol). The latter is transformed into 2 - guanidino-3,3-diphenyl-5-hexyl-$\Delta^1$-pyrroline hydrochloride as in Example 8. Melting point 151° (from acetic ester).

Example 11

1.19 g. of 2-amino-3,3-diphenyl-$\Delta^1$-pyrroline and 0.93 g. of 3,5-dimethyl-1-nitroguanidinopyrazole are heated to reflux in 30 ml. of absolute alcohol for 2 hours. 2-nitroguanidino-3,3-diphenyl-$\Delta^1$-pyrroline of melting point 195° crystallizes out on cooling to 0°.

15 g. of 2-nitroguanidino-3,3-diphenyl-$\Delta^1$-pyrroline are suspended in 250 ml. of methanol and to the suspension, concentrated hydrochloric acid is carefully added up to solution. After the addition of 3 g. of 5 percent palladium-carbon catalyst, the mixture is hydrogenated at room temperature and normal pressure. The hydrogen uptake amounts to approximately 3 mol equivalents. After filtering off the catalyst, the solvent is removed, the residue treated with water, acidified with a little hydrochloric acid and filtered. The filtrate is made alkaline with 15 percent caustic soda and ether and extracted. The ethereal phase is extracted several times with 2 percent acetic acid and washed with water. From the acetic acid extracts combined with the wash waters, with 15 percent caustic soda, there is precipitated 2 - guanidino - 3,3-diphenyl-$\Delta^1$-pyrroline of melting point 189–191°. The product can be further purified by recrystallizing it from 50 percent ethanol and/or from benzene/petroleum ether 2:1.

Example 12

A solution of 10 g. of 2-amino-3,3-diphenyl-5-methyl-$\Delta^1$-pyrroline in 300 ml. of absolute ethanol is treated with 7.32 g. of 1-nitroguanyl-3,5-dimethyl-pyrazole. The resultant mixture is heated to reflux on the water-bath for two hours. After standing overnight, 2-nitroguanidino-3,3-diphenyl-5-methyl-$\Delta^1$-pyrroline precipitates in long felted needles, melting point 188.5°.

1.12 g. of 2-nitroguanidino-3,3-diphenyl-5-methyl-$\Delta^1$-pyrroline are suspended in 50 ml. of methanol and to the suspension, there is carefully added concentrated hydrochloric acid up to solution. After addition of 300 mg. of 5 percent palladium-carbon catalyst, the mixture is hydrogenated at room temperature and normal pressure (hydrogen uptake 2.8 mol equivalents). The so-obtained medium is filtered to remove the catalyst, the solvent is removed by evaporation and the residue is triturated with a little ether and ethanol giving 2-guanidino-3,3-diphenyl-5-methyl-$\Delta^1$-pyrroline hydrochloride melts at 254–256°. The free base melts at 156–158°.

Example 13

17 g. of 2 - amino - 3-phenyl-3-cyclohexen-1'-yl-$\Delta^1$-pyrroline are heated to reflux with 14.3 g. of 1-nitroguanyl-3,5-dimethylpyrazole for two hours in 200 ml. of absolute ethanol. On cooling of the reaction mixture, there crystallizes 2 - nitroguanidino-3-phenyl-3-cyclohexen-1'-yl-$\Delta^1$-pyrroline of melting point 149°.

13 g. of 2-nitroguanidino-3-phenyl-3-cyclohexen-1'-yl-$\Delta^1$-pyrroline are suspended in 200 ml. of methanol. The suspension is treated dropwise with concentrated hydrochloric acid up to solution. 2.6 g. of 5 percent palladium-carbon catalyst are thereafter added and the resultant mixture is hydrogenated at normal pressure and room temperature. After nine hours, the hydrogen uptake amounts to 3.2 mol equivalents. The hydrogenated medium is filtered to remove the catalyst and the solvent is evaporated off. The residue is dissolved in water, the water solution is filtered if necessary, thereafter alkalized and ether-extracted. The ethereal extract is extracted itself with 2–3 percent acetic acid and washed twice with water. The acetic acid extract and the wash water are combined and made alkaline with caustic soda giving 2-guanidino-3-phenyl-3-cyclohexen-1'-yl-$\Delta^1$-pyrroline. For purification, the product is dissolved in as little 1 N hydrochloric acid as is possible, shaken with animal carbon, filtered and precipitated with 2 N caustic soda. Recrystallization from ethanol/water (8:5) yields the compound of melting point 154–156°.

Example 14

5.28 g. of 2 - amino - 3,3-diphenyl-4,4-dimethyl-$\Delta^1$-pyrroline are heated to reflux for three hours in 50 ml. of absolute ethanol with 3.5 g. of 1-nitroguanyl-3,5-dimethyl-pyrazole. 2 - Nitroguanidino-3,3-diphenyl-4,4-dimethyl-$\Delta^1$-pyrroline crystallize on cooling.

3 g. of 2 - nitroguanidino - 3,3-diphenyl-4,4-dimethyl-$\Delta^1$-pyrroline are dissolved in 20 ml. of dioxane and treated with 1.2 g. of glacial acetic acid. The mixture is hydrogenated at room temperature and normal pressure in the presence of 1.5 g. of palladium-carbon catalyst for three days. The dioxane is thereafter removed in vacuum, the residue is treated with water and the precipitate which forms is filtered off. The aqueous filtrate solution is alkalized and yields 2-guanidino-3,3-diphenyl-4,4-dimethyl-$\Delta^1$-pyrroline of melting point 166–169°.

Example 15

5 g. of 2-amino-3,3-diphenyl-5-methyl-$\Delta^1$-pyrroline and 7.48 g. of N,N'-bisbenzhydrylcarbodiimide are successively added to 20 ml. of benzene. The reaction mixture is heated to reflux on a boiling water-bath for three hours under anhydrous conditions. After cooling to room temperature, the reaction mixture is agitated with 20 ml. of 2 N hydrochloric acid and filtered. The precipitate is washed with ether and re-dissolved from 200 ml. of 50 percent ethanol yielding 2-(N,N'-bisbenzhydrylguanidino)-3,3-diphenyl-5-methyl-$\Delta^1$-pyrroline hydrochloride of melting point 219–221°.

1.32 g. of 2-(N,N'-bisbenzhydrylguanidino)-3,3-diphenyl-5-methyl-$\Delta^1$-pyrroline hydrochloride are dissolved at 20° in 20 ml. of 99–100 percent formic acid. The resulting solution is treated with 6 ml. of 64 percent aqueous hydrobromic acid. The reaction mixture is then heated to reflux for 90 minutes, thereafter cooled to room temperature and evaporated to dryness. The colorless residue is dissolved in ether and 2 N hydrochloric acid. The aqueous phase is separated, filtered, made alkaline while cooling, yielding 2 - guanidino-3,3-diphenyl-5-methyl-$\Delta^1$-pyrroline. Upon recrystallization from 50 percent aqueous ethanol, the product melts at 155–157°.

Example 16

In the manner described in Example 15 utilizing 2-amino - 3,3 - diphenyl - 4,4 - dimethyl-$\Delta^1$-pyrroline and N,N'-bisbenzhydrylcarbodiimide as starting materials, there is obtained 2-(N,N'-bisbenzhydrylguanidino)-3,3-diphenyl-4,4-dimethyl-$\Delta^1$-pyrroline, M.P. 265–269°, which is converted into 2-guanidino-3,3-diphenyl-5-methyl-$\Delta^1$-pyrroline, M.P. 166–169°, as described in Example 15.

Example 17

In the manner described in Example 15, utilizing 2-amino-3-phenyl - 3 - cyclohexen-1'-yl-$\Delta^1$-pyrroline and N,N'-bisbenzhydrylcarbodiimide as starting materials, there is obtained 2-(N,N'-bisbenzhydrylguanidino)-3-phenyl - 3 - cyclohexen-1'-yl-$\Delta^1$-pyrroline hydrochloride, melting point 243–247°. Treatment of this compound with formic acid/hydrobromic acid in the manner described in Example 15 yields 2-guanidino-3-phenyl-3-cyclohexen-1'-yl-$\Delta^1$-pyrroline, melting point 146–148°.

Example 18

1.5 g. of 2-cyanamido-3,3-diphenyl-5-methyl-$\Delta^1$-pyrroline are suspended in 10 ml. of absolute ether. A solution of 1.03 g. of dithiophosphoric acid-O,O-diethyl ester in 5 ml. of absolute ether is thereafter added dropwise with vigorous stirring at 0°. The reaction mixture is stirred for a further half hour, then the cooling is removed and dry hydrochloric acid gas is introduced up to saturation. The clear solution is treated with 15 ml. of low-boiling petroleum ether. The supernatant is then decanted and the residue is triturated with alcohol/ether, whereby 2-thioureido-3,3 - diphenyl-5-methyl-$\Delta^1$-pyrroline hydrochloride crystallizes (melting point 180–183°). The free base is obtained by dissolving the hydrochloride in a little dimethylformamide, alkalizing with 2 N caustic soda and diluting the solution with water. The base melts at 140–142° (from ethanol).

Example 19

3 g. of 2-guanidino-3,3-diphenyl-5-methyl-$\Delta^1$-pyrroline are heated on a boiling water-bath for 47 hours with 9 ml. of 64 percent aqueous hydrobromic acid in 60 ml. of 99 percent formic acid. The reaction mixture is evaporated to dryness, the residue is dissolved in 100 ml. of water and filtered. The filtrate is made alkaline and ether-extracted. The ether extracts are themselves extracted three times with 1 N hydrochloric acid and the combined hydrochloric acid extracts are made alkaline and filtered. The precipitate is washed with a little ether giving 2-ureido-3,3-diphenyl-5-methyl-$\Delta^1$-pyrroline. The base is converted into the hydrochloride according to conventional techniques and melts at 157–158° (from alcohol).

Example 20

In the manner described in Example 5, from O,N,N-trimethylisourea and 2-amino-3,3-diphenyl-5-methyl-$\Delta^1$-pyrroline, there is obtained 2-(N-dimethyl)guanidino-3,3-diphenyl-5-methyl - $\Delta^1$ - pyroline hydrochloride hydrate, melting point 135–140° or 235°.

Example 21

0.01 mol of 2-amino-3,3-diphenyl-5-methyl-$\Delta^1$-pyrroline are dissolved in 50 ml. of hot absolute benzene. 0.01 mol of n-butylisothiocyanate are added to this solution and the reaction mixture is heated to reflux for 16 hours. The solvent is then evaporated and the oily residue dissolved in 8 ml. of ethanol. 24 ml. of 2 N hydrochloric acid are added and the precipitate obtained is recrystallized from ethanol/hydrochloric acid. There is obtained 2-(N'-n-butyl)-thioureido - 3,3 - diphenyl - 5-methyl-$\Delta^1$-pyrroline-hydrochloride of melting point 145–147°.

Example 22

In analogy to Example 21, from dimethylaminopropyl isothiocyanate and 2-amino - 3,3 - diphenyl-5-methyl-$\Delta^1$-pyrroline, there is obtained 2(N'-dimethylamino)-thioureido-3,3-diphenyl-5-methyl-$\Delta^1$-pyrroline - hydrochloride of melting point 178–181°.

Example 23

0.01 mol of 2-amino-3,3-diphenyl-5-methyl-$\Delta^1$-pyrroline are dissolved at room temperature in 20 ml. of ethanol. 0.01 mol of methoxymethylisothiocyanate are added to this solution and the reaction mixture is allowed to stand at room temperature for 4 hours. The resulting precipitate is filtered off, washed with a small amount of cold ethanol, dried and dissolved in 30 ml. of benzene. The resulting solution is refluxed for 16 hours and then evaporated in vacuum. The oily residue is worked up in accordance with the procedure described in Example 21. Treatment of the so-obtained hydrochloride affords the free base, 2(N'-methoxy-methyl)-thioureido-3,3-diphenyl-5-methyl-$\Delta^1$-pyrroline of melting point 124°.

Example 24

In analogy to Example 23, from 2-amino-3,3-diphenyl - $\Delta^1$ - pyrroline and methoxymethylisothiocyanate, there is obtained 2-(N'-methoxymethyl)-thioureido-3,3-diphenyl-$\Delta^1$-pyrroline of melting point 111°.

Example 25

In analogy to Example 23, from 2-amino-3,3-diphenyl-5-methyl-$\Delta^1$-pyrroline and carbethoxymethylisothiocyanate, there is obtained 2-(N'-carbethoxymethyl)-thiouredo-3,3-diphenyl-5-methyl - $\Delta^1$ - pyrroline-hydrochloride of melting point 177–183° (dec.).

Example 26

A solution of 0.01 mol 2-amino-3,3-diphenyl-5-methyl-$\Delta^1$-pyrroline in 25 ml. of ethanol is prepared. 0.01 mol of p-ethoxyphenylisothiocyanate are added thereto and the reaction mixture is allowed to stand at room temperature for 12 hours. The precipitate is separated, washed with little cold alcohol and recrystallized from a suitable solvent (e.g., from ethanol or benzene-petroleum ether). There is obtained 2-(N'-ethoxyphenyl)-thioureido-3,3-diphenyl-5-methyl-$\Delta^1$-pyrroline of melting point 151°.

Example 27

A solution of 1.25 g. of 2-amino-3-phenyl-3-p-toluyl-$\Delta^1$-pyrroline and 0.9 g. of 1-nitroamidino-3,5-dimethyl-pyrazole in 10 ml. of absolute ethanol is heated to reflux for 2 hours and then cooled to 0°. 2-nitroguanidino-3-phenyl - 3-p-toluyl-$\Delta^1$-pyrroline crystallizes on standing. Melting point 194° (from benzene).

16.5 g. of 2-nitroguanidino - 3 - phenyl - 3 - p-toluyl-$\Delta^1$-pyrroline are suspended in 200 ml. of methanol. Concentrated hydrochloric acid is added dropwise up to solution. After the addition of 4 g. of palladium catalyst, the reaction mixture is hydrogenated at room temperature and normal pressure. 3.1 mol equivalents of hydrogen are taken up. The catalyst is filtered off, the solvent is evaporated and the residue is taken up in 200 ml. of water. The aqueous solution is alkalized and extracted twice with ether. The ethereal extracts are extracted three times with 2–3 percent acetic acid and twice with water. The aqueous extracts are combined and adjusted to an alkaline pH by the addition of 2-N sodium hydroxide in the cold. The oily 2-guanidino-3-phenyl-3-p-toluyl-$\Delta^1$-pyrroline crystallizes on standing. Recrystallization from benzene/petroleum ether (6–80°) (2:1) and ethanol/water (4:3) affords a product of melting point 150–155°.

Example 28

3,3 - diphenyl-3-cyano-1-ethyl-propyl isocyanate added to a solution of 10.8 g. of potassium hydroxide in 100 ml. of methanol and heated at reflux on the steam-bath for 30 minutes. A granular precipitate forms. After cooling, the suspension is acidified with 3 N hydrochloric acid, treated with 400 ml. of water and washed three times with ether. The aqueous phase is made alkaline with 30 percent caustic soda and extracted with ether. After washing, drying and evaporation in vacuum, the ether extracts yields 2 - amino-3,3-diphenyl-5-ethyl-$\Delta^1$-pyrroline. Melting point 159–161°.

The starting material can be obtained as follows:

192 g. of ethylmalonic acid dimethyl ester and 100 g. of 45 percent aqueous dimethylamine solution are added, with stirring and cooling, to 113 g. of 40 percent aqueous formalin solution carefully while maintaining the temperature below 30°. The resultant mixture is further stirred at room temperature for 20 hours and then adjusted to pH 3–4 with cooling and careful addition of concentrated hydrochloric acid. The so-prepared mixture is then washed twice with acetic acid ester, the aqueous phase is evaporated in vacuum and the residue is desiccated by azeotropic evaporation by means of benzene/alcohol (1:1). The so-obtained residue is taken up in boiling alcohol, filtered hot and treated with acetic acid ester, whereupon 2-(dimethylaminomethyl)-2-ethyl-malonic acid dimethyl ester hydrochloride crystallizes (M.P. 170°).

126.8 g. of 2-(dimethylaminomethyl)-2-ethyl-malonic acid dimethyl ester hydrochloride are mixed with 130 ml. of 4 N caustic soda and rapidly extracted three times with 200 ml. of acetic acid ester each time. After washing with 10 percent sodium chloride soltuion, the acetic ester phases are dried over magnesium sulphate and evaporated in vacuum at 50° bath-temperature. The residual oil is dissolved in 250 ml. of absolute ethanol, treated with 34 ml. of methyl iodide and heated under reflux for 7 hours in a water-bath of 65°. The solution is evaporated in vacuum, the residue is dissolved in 800 ml. of water and washed three times with 100 ml. of acetic ester each time. The aqueous phase is separated and evaporated in vacuum. The residue is azeotropically dried with benzene/alcohol and crystallized from alcohol at 0°. The trimethylammoniummethyl-ethylmalonic acid dimethyl ester iodide thus obtained does not melt until 280°.

38.6 g. of diphenylacetonitrile are added to a solution of 5.06 g. of sodium in 120 ml. of absolute ethanol. The resulting mixture is heated to boiling for 5 minutes, cooled to 40° and to the so-cooled medium, there is carefully added over a period of 10 minutes, 71.8 g. of trimethylammoniummethyl-ethylmalonic acid dimethyl ester iodide. The resulting suspension is heated under reflux on the steam-bath for four hours, evaporated in vacuum, taken up in water and acetic ester and treated with 3 N hydrochloric acid up to the acidic reaction. After washing and drying, the acetic ester extract is evaporated in vacuum leaving ethyl(2,2 - diphenyl-2-cyanoethyl)-malonic acid dimethyl ester as an oil.

69 g. of ethyl-(2,2-diphenyl-2-cyanoethyl)-malonic acid dimethyl ester in 400 ml. of alcohol and 70 g. of potassium hydroxide in 100 ml. of water are heated at reflux for 4 hours. The alcohol is evaporated in vacuum and the residue is taken up with water and ether. After washing with ether, the aqueous phase is made congo-acid with conc. hydrochloric acid and extracted with acetic ester. After washing, drying and evaporation of the organic phase there is obtained an oil which after crystallization from alcohol/water gives 2-ethyl-4-cyano-4,4-diphenylbutyric acid of melting point 120–122°.

12 g. of 2-ethyl-4-cyano-4,4-diphenylbutyric acid are heated at reflux for 45 minutes, with exclusion of moisture, with 60 ml. of thionyl chloride. The mixture is then evaporated in vacuum and the remaining thionyl chloride is removed by evaporating four times utilizing benzene. The residual oil is dried in vacuum at 50° for 30 minutes, thereupon dissolved in 60 ml. of acetone, cooled to −10° and treated carefully with stirring at −5 to −10° with a solution of 3.37 g. of sodium azide in 30 ml. of water. The resulting mixture is stirred at −5° for a further 20 minutes, diluted with ice-water, and rapidly extracted with three portions of pre-cooled benzene. The extracts are combined, washed with ice cold 10 percent soduim chloride solution and dried in the cold over sodium sulphate. The benzene solution is filtered, the filtrate heated at 35° in the water-bath for 1 hour, then for 30 minutes each time at the following temperatures, 45°, 55° and reflux temperature (nitrogen-evolution), and then evaporated in vacuum giving 3,3-diphenyl-3-cyano-1-ethyl-propyl isocyanate of melting point 78–80°.

Example 29

3,3-diphenyl-3-cyano-1-butyl-propyl isocyanate is saponified in the manner described in Example 28. 2-amino-3,3 - diphenyl - 5 - butyl - $\Delta^1$ - pyrroline of melting point 119–121° (from alcohol/water) is obtained.

The starting material can be manufactured as follows:

96.5 g. of diphenylacetonitrile are added to a solution of 1.15 g. of sodium in 50 ml. of absolute methanol, and after slight heating, treated with 78.1 g. of 2-butyl-acrylic acid ethyl ester. The so-formed mixture is heated at reflux for 5 hours, allowed to cool, adjusted to pH 6 with glacial acetic acid and partitioned between water and acetic acid ester. After washing, drying and evaporating the acetic ester solution, crystalline 2-butyl-4-cyano-4,4-diphenyl-butyric acid ethyl ester (melting point 57–58°) is obtained. The ester is saponified to give 2-butyl-4-cyano-4,4-diphenyl-butyric acid (melting point 130–132°). The acid is converted into the isocyanate by Curtius degradation as described above in Example 28 for the corresponding 2-ethyl compound.

Example 30

In the same manner as Example 28, from 3,3-diphenyl-3-cyano-1-isobutyl-propyl isocanate, there is obtained 2 - amino - 3,3 - diphenyl - 5 - isobutyl - $\Delta^1$ - pyrroline of melting point 154–156° (from alcohol/water).

The starting material can be manufactured as follows: 2-isobutylacrylic acid ethyl ester is converted into 2-isobutyl-4-cyano-4,4-diphenylbutyric acid, melting point 122–123° (from alcohol/water), as described in the appendix to Example 29 for the corresponding butyl compound. Curtius degradation of the acid as described in Example 28 for the corresponding 2-ethyl compounds yields 3,3-diphenyl-3-cyano-1-isobutyl-propyl isocanate.

Example 31

In analogy to Example 28, from 3,3-diphenyl-3-cyano-1-hexyl-propyl isocyanate, there is obtained 2-amino-3,3-diphenyl-5-hexyl-$\Delta^1$-pyrroline of melting point 100–101° from ether/petroleum ether).

The starting material can be manufactured as follows: 2-hexylacrylic acid ethyl ester is converted into 2-hexyl-4-cyano-4,4-diphenylbutyric acid, melting point 99–101° (from alcohol/water), as described in Example 29 for the 2-butyl derivative. Curtius degradation of the acid in a manner simlar to that described in Example 28 yields 3,3-diphenyl-3-cyano-1-hexyl-propyl isocyanate.

Example 32

To 30 g. of 2,2-diphenyl-4-bromobutyronitrile is added 100 ml. of liquid ammonia. The resulting mixture is allowed to stand at room temperature for one hour. The reaction mixture is then slowly heated up to boiling in the water-bath and left thusly for 6 hours. After cooling and evaporation of the ammonia, the residue is treated with 1200 ml. of water and 45 ml. of concentrated hydrochloric acid. The solution, whilst warm is extracted three times with 400 ml. of benzene. After cooling, the hydrochloric acid layer is alkalized with 15 percent caustic soda, whereby 2-amino-3,3-diphenyl-$\Delta^1$-pyrroline of melting point 211° precipitates.

Example 33

47.9 g. of 2-phenyl-2-cyclohexen-1'-yl-4-bromobutyronitrile are dissolved in 50 ml. of absolute ethanol and treated, with careful agitation, with about 50 ml. of liquid ammonia. The reaction mixture is shaken for one hour at room temperature and for 8 hours at 100° in a shaking autoclave. The solvent is then evaporated, the residue treated with about 400 ml. of water and acidified with acetic acid. The aqueous solution is extracted twice with 60 ml. of benzene each time. The combined benzene extracts are extracted twice with 150 ml. of water each time. The combined aqueous solutions are made alkaline with 15 percent caustic soda yielding 2-amino-3-phenyl-3-cyclohexen-1'-yl-$\Delta^1$-pyrroline, melting point 178° (from benzene).

The 2 - phenyl-2-cyclohexen-1'-yl-4-bromobutyronitrile used as starting material can be obtained as follows:

80 g. of hexenylphenylacetonitrile are boiled with 17 g. of sodium amide for 5 hours in benzene under reflux conditions while stirring. The solution turns dark brown, and towards the end of the reaction, the sodium salt of cyclohexenylphenylacetonitrile separates out. To the cooled reaction mixture, 60 ml. of ethylene bromide are added with stirring over a period of one minute. After cessation of the exothermic reaction, the mixture is boiled, with stirring, for two and a half hours. The reaction mixture is washed with water, the benzene solution is dried and the benzene and excess ethylene bromide are evaporated off as completely as possible. The residue is fractionated in high vacuum and yields 2-phenyl-2-cyclohexen-1'-yl-4-bromobutyronitrile of boiling point 140–145° at 0.005 torr, $n_D^{20}$ 1.5630.

Example 34

39 g. of diphenylacetonitrile in 160 ml. of toluene are added with stirring and exclusion of moisture to a suspension of 8.4 g. of sodium amide in 80 ml. of toluene. The reaction mixture is heated at 90° (bath) for two and a half hours and on the boiling water-bath for a further 30 minutes. The reaction mixture is cooled to 10°, then 23 g. of N-carbethoxy-propyleneimine are added carefully and the mixture is allowed to stand at 20° for 7 days. The mixture is thereafter heated on the boiling water-bath for 4 hours, cooled, cautiously treated, while cooling, with aqueous hydrochloric acid (40 ml. of concentrated hydrochloric acid and 120 ml. of ice-water) and then stirred at 20° for 24 hours. The aqueous phase is separated off and the organic phase is again extracted with 50 ml. of 2 N hydrochloric acid. The combined aqueous extracts are diluted to 600 ml. with water, extracted with ether and then alkalized. The precipitated base is taken up in ether, the ether is evaporated and the residue is heated at reflux for 8 hours with alcoholic caustic potash (21 g. of KOH in 210 ml. of 96 percent alcohol). The resulting reaction medium is thereafter filtered and evaporated to dryness. The residue is dissolved in dilute hydrochloric acid, the resulting solution filtered and then made alkaline yielding a base-mixture of melting point 130–150°.

The base-mixture is dissolved in 50 ml. of hot alcohol, treated with 30 ml. of hot water and left at room temperature for 14 hours whereby 2 - amino - 3,3 - diphenyl-5-methyl-$\Delta^1$-pyrroline of melting point 148–153° crystallizes. The mother liquor is concentrated to about 20 percent, whereby an intermediate fraction of melting point 130–150° crystallize. The filtrate thereof is acidified with acetic acid and treated with dilute nitric acid (100 ml. of water and 20 ml. of concentrated nitric acid). After standing overnight, the nitrate salt is isolated and recrystallized from 80 ml. of water. Conversion into the free base gives 2-amino-3,3-diphenyl-4-methyl-$\Delta^1$-pyrroline of melting point 174° (from benzene/petroleum ether).

Example 35

69.5 g. of diphenylacetonitrile in 350 ml. of toluene are added carefully with stirring, with exclusion of moisture, to a suspension of 14.6 g. of sodium amide in 50 ml. of toluene. The reaction mixture is heated at 90° (bath) for two and a half hours and at 100° (bath) for 30 minutes. After cooling, 47.5 g. of N-carbethoxyisobutyleneimine are carefully added with stirring and the resultant mixture is allowed to stand at 20° for 6 days with occasional stirring. It is then heated at 45° for 30 minutes and thereupon treated, with cooling, with 90 ml. of concentrated hydrochloric acid in 250 ml. of ice-water and left at 20° for a further 2 days with more frequent stirring. The aqueous phase is then separated off and the organic phase is extracted several times with dilute hydrochloric acid. The combined hydrochloric acid extracts are diluted with 300 ml. of water and extracted with ether. The hydrochloric acid phase is made alkaline, whereby crystallization occurs. The precipitate is filtered off and washed with ether giving 2 - carbethoxyamino - 3,3 - diphenyl-4,4-dimethyl-$\Delta^1$-pyrroline of melting point 155–158°.

20 g. of 2-carbethoxyamino-3,3-diphenyl-4,4-dimethyl-$\Delta^1$-pyrroline are heated to reflux for 10 hours in a solution of 20 g. of potassium hydroxide in 200 ml. of 96 percent alcohol. After filtration, the solution is concentrated to dryness and the residue dissolved in dilute hydrochloric acid. The solution is filtered and made alkaline with caustic soda giving 2 - amino - 3,3 - diphenyl-4,4-dimethyl-$\Delta^1$-pyrroline which melts at 170–171° after recrystallisation from 50 percent alcohol.

The filtrate obtained on filtration of the 2-carbethoxy-amino-3,3-diphenyl-4,4-dimethyl-$\Delta^1$-pyrroline is extracted with ether. After evaporation, the ether extract yields an oily base. The oily base is added to dilute nitric acid (7 ml. of concentrated nitric acid in 180 ml. of water), the resulting medium heated to boiling, then treated with alcohol up to complete solution and allowed to stand overnight. The precipitate which forms is separated off, dissolved in 20 ml. of hot alcohol and, after cooling, treated with 10–20 ml. of ether. There is thus obtained the nitrate salt of melting point 172–175°. It is converted into the base which melts at 125–128° (from ether) by conventional techniques. 3 g. of the last mentioned base are heated to reflux for 12 hours with a solution of 3 g. of potassium hydroxide in 30 ml. of alcohol. The reaction solution is filtered and evaporated to dryness. The residue is dissolved in dilute hydrochloric acid, the solution is filtered and made alkaline giving 2-amino-3,3-diphenyl-4,4-dimethyl-$\Delta^1$-pyrroline of melting point 170–171°.

Example 36

A suspension of 13.2 g. of 2 - amino - 3,3 - diphenyl-4-methyl-$\Delta^1$-pyrrolin-5-one in 50 ml. of N-methylmorpholine is heated at 50° and treated in 10 portions with 4 g. of lithium aluminium hydride. The reaction mixture is then heated on the boiling water-bath for two and a half hours and the solvent is finally distilled off in vacuum. After cooling, the residue is overlaid with 200 ml. of ether and cautiously treated at first with acetic ester and then with alcohol. Water is thereupon carefully added so that an inorganic precipitate viscously coagulates. The organic phase is decanted and the residue is treated twice with acetic ester and twice with ether and decanted. The combined organic phases are washed with water and extracted with 5 percent hydrochloric acid. The hydrochloric acid phase is separated off, made alkaline and extracted with chloroform. After distilling off the chloroform, there remains an oil which crystallizes upon addition of ether giving 2-amino-3,3-diphenyl-4-methyl-$\Delta^1$-pyrroline which melts at 172–174° after recrystallization from 60 percent alcohol.

The 2 - amino–3,3-diphenyl-4-methyl-$\Delta^1$-pyrrolin-5-one used as a starting material can be manufactured as follows:

5 g. of $\alpha$-methyl-$\beta,\beta$-diphenyl-$\beta$-cyanopropionic acid are heated on the water-bath for one hour with 15 ml. of thionyl chloride. The thionyl chloride is distilled off, the residue treated with 50 ml. of benzene, the benzene distilled off in vacuum and the residue again dissolved in 150 ml. of benzene. Ammonia is added into this solution over a period of one hour with agitation. The solution is then filtered and the residue dissolved hot in 30 ml. of 90 percent alcohol and then treated with 250 ml. of hot water. $\alpha$-Methyl-$\beta,\beta$-diphenyl-$\beta$-cyanopropionic acid amide of melting point 200–201° is obtained.

2.64 g. of the last mentioned compound are suspended in 40 ml. of methanol. The suspension is treated with 0.8 g. of sodium hydroxide in 5 ml. of water and shaken up to solution. The solution is filtered and the filtrate treated with 100 ml. of 5 percent acetic acid giving 2-amino-3,3-diphenyl-4-methyl-$\Delta^1$-pyrrolin-5-one of melting point 265–270°.

Example 37

A suspension of 0.4 g. of 2-amino-3,3-diphenyl-4,4-dimethyl-$\Delta^1$-pyrrolin-5-one in 5 ml. of N-methylmorpholine is treated with 0.12 g. of lithium aluminum hydride at 50°. After cessation of the reaction, the mixture is heated on a boiling water-bath for an additional 3 hours. The reaction mixture is thereupon concentrated to dryness in vacuum. The residue is overlaid with ether and cautiously treated with water until the inorganic portions coagulate. The ether is decanted off and the residue washed with acetic ester and ether. The combined organic phases are washed with water and extracted with dilute acetic acid. The acetic acid solution is alkalized and yields 2-amino-3,3-diphenyl-4,4-dimethyl-$\Delta^1$-pyrroline.

The 2 - amino-3,3-diphenyl-4,4-dimethyl-$\Delta^1$-pyrrolin-5-one used as starting material can be manufactured as follows:

0.9 g. of $\alpha,\alpha$ - dimethyl - $\beta,\beta$-diphenyl-$\beta$-cyanopropionic acid are heated to reflux for 2 hours with 5 ml. of thionyl chloride. The excess thionyl chloride is distilled off, the mixture is evaporated off twice with benzene and the residue is dissolved in 30 ml. of benzene. Ammonia is led into the solution, initially at 20°, then at 40–45°. The precipitate is filtered off and washed with warm water giving 2 - amino - $\alpha,\alpha$ - dimethyl-$\beta,\beta$-diphenyl-$\beta$-cyanopropionic acid amide of melting point 215–216°.

0.6 g. of the amide are suspended in 5 ml. of methanol and shaken with 5 ml. of 5 percent caustic soda up to solution. 50 ml. of 10 percent acetic acid are then added and the mixture is filtered giving 2-amino-3,3-diphenyl-4,4-dimethyl-$\Delta^1$-pyrrolin-5-one of melting point 305°.

Example 38

To a solution of 31.91 g. of 2-phenyl-2-p-toluyl-4-bromobutyronitrile in 30 ml. of absolute ethanol 30 ml. of liquid ammonia are added with carefully shaking the solution. The mixture is kept for 8 hours at 100° in a rocking autoclave. After cooling the mixture, the excess ammonia is blown off, the solvent is decanted, the residue acidified with 500 ml. of 2% acetic acid and finally extracted with benzene. This benzene extract is washed with water, the acetic acid solution and the washing water are combined and the resulting solution is made alkaline with 2 N NaOH while cold. The 2-amino-3-phenyl-3-p-toluyl-$\Delta^1$-pyrroline formed is filtrated, washed with water until neutral and dried over potassium hydroxyde. Melting point 161–163° (methanol/water 2:1).

The 2 - phenyl - 2-p-toluyl-4-bromobutyronitrile can be obtained as follows:

42 g. p-toluyl-phenylacetonitrile are kept with 8.5 g. sodium amide in benzene at reflux temperature while continuously stirring the mixture. The reaction mixture is cooled to room temperature, and with stirring 30 ml. of ethylenbromide are added over a period of one minute. The mixture is kept at reflux temperature for another 2½ hours with stirring. Sodium bromide separates and is removed by washing the mixture twice with water. The benzene solution is dried over sodium sulfate, the excess ethylenebromide and the benzene are removed in vacuo as quantitatively as possible. The remaining dark brown oil is fractionated at 0.005 torr, whereby 2-phenyl-2-p-toluyl-4-bromo-butyronitrile is distilled at 150–153° as a colourless viscous oil.

Example 39

13.3 g. of 2-amino-3,3-diphenyl-4-n-butyl-$\Delta^1$-pyrrolin-5-one are warmed to 50° in 50 ml. of N-methylmorpholine. 3.5 g. of lithiumaluminiumhydride are added in 8 batches and the mixture is kept for 2 hours on the water bath. The solvent is distilled under reduced pressure and to the residue are subsequently added 150 ml. of ether, 100 ml. of ethylacetate and the necessary amount of water to obtain the residue in granular form. The liquid phase is decanted and the residue is washed 3 times with 30 ml. of ethylacetate and 30 ml. of ether.

The collected organic phases are washed with water, dried and evaporated. The oily residue is dissolved in 0.5 N hydrochloric acid, the solution is diluted to 400 ml., shaken with charcoal and filtered. Sodium hydroxide is added to the filtrate in order to precipitate the product. The crystals obtained are reciprocated from dilute acetic acid/sodium hydroxide giving crude 2-amino-3,3-diphenyl-4-n-butyl-$\Delta^1$-pyrroline. This material is recrystallized from 60% ethanol, melting point 155–157°.

The 2-amino - 3,3 - diphenyl-4-n-butyl-$\Delta^1$-pyrrolin-5-one is obtained as follows:

To a suspension of 5 g. sodium amide in 50 ml. of toluene 24.6 g. of diphenylacetonitrile in 150 ml. of toluene are added. The mixture is stirred for 2 hours at 80–90°. After cooling the solution to 45° 26.3 g. of α-bromocapronic acid methylester are added with stirring. The mixture is kept for 14 hours at 20° then heated on a steam bath with stirring for 2½ hours. After cooling, the solution is shaken with water, the organic layer is separated, dried and evaporated in vacuo. The oily residue is fractionated in high vacuum giving 3-cyano-3,3-diphenyl-2-n-butyl-propionic acid methylester of boiling point 155–156°/0.001 mm.; $n_D^{20}$=1.5443.

4.5 g. of 3-cyano-3,3-diphenyl-2-n-butyl-propionic acid methylester and 3 g. of potassium hydroxide in 22 ml. of 96% ethanol are kept on the steam bath for 14 hours. 500 ml. of water are added and the mixture is shaken with charcoal and then filtered. On acidifying the filtrate 3-cyano-3,3-diphenyl-2-n-butylpropionic acid, M.P. 165°, is obtained.

To 3.8 g. of 3-cyano-3,3-diphenyl-2-n-butylpropionic acid, there are added 15 ml. benzene and 10 ml. of thionyl chloride. The mixture is refluxed for 2 hours, then evaporated in vacuo. The residue is dissolved in 150 ml. of benzene. Ammonia is bubbled through the solution, first at 30°, then at 50°. The precipitate is separated from the solution by filtration and recrystallized from 70% alcohol to give 3-cyano-3,3-diphenyl-2-n-butylpropionic acid amide of melting point 253°.

14.5 g. of 3-cyano-3,3-diphenyl-2-n-butylpropionic acid amide are treated with 100 ml. of methanol and 4.2 g. of sodium hydroxide in 20 ml. of water under slight heating until a homogeneous solution is obtained. After 10 minutes, $CO_2$ is bubbled through the solution at 20° until a pH value of 8–9 is obtained. 300 ml. of water are added gradually. The precipitate is filtrated yielding 2-amino - 3,3 - diphenyl-4-n-butyl-$\Delta^1$-pyrrolin-5-one, M.P. 175–178°.

Example 40

Tablet formulation:                                   Mg.

Active ingredient (for example 2-guanidino-3,3-diphenyl - 5 - methyl - $\Delta^1$ - pyrrolinehydrochloride _____ 56.25
Lactose _____ 73.75
Cornstarch _____ 66.00
Talcum _____ 3.60
Magnesiumstearate _____ 0.40

Total _____ 200.00

We claim:
1. A compound selected from the group consisting of a compound of the formula

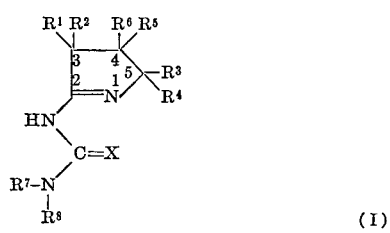

(I)

a compound of the formula

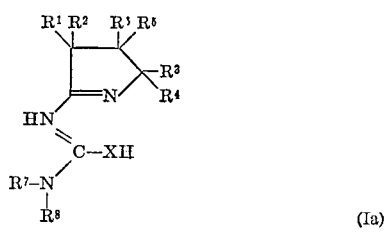

(Ia)

a compound of the formula

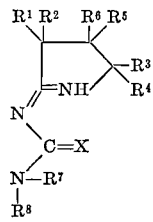

(Ib)

wherein $R^1$ is phenyl, or phenyl substituted by lower alkyl, lower alkoxy or halogen; $R^2$ is lower cycloalkyl, lower cycloalkenyl, phenyl or phenyl substituted by lower alkyl, lower alkoxy or halogen; $R^3$, $R^4$, $R^5$, $R^6$ and $R^8$ are, individually, hydrogen or lower alkyl; $R^7$ is hydrogen, lower alkyl, lower carbalkoxy-lower alkyl, di-lower alkylamino-lower alkyl, lower alkoxy phenyl or lower alkoxy-lower alkyl; and X is oxo, thioxo or imino, and pharmaceutically acceptable acid addition salts thereof with pharmaceutically acceptable acids.

2. A compound as defined in claim 1 wherein $R^1$ and $R^2$ are phenyl and $R_3$, $R_4$, $R_5$, $R_6$, $R_7$ and $R_8$ are selected from the group consisting of hydrogen and lower alkyl.

3. A compound as defined in claim 1 of the formula 2-guanidino-3,3-diphenyl-$\Delta^1$-pyrroline.

4. A compound as defined in claim 1 of the formula 2-guanidino-3,3-diphenyl-5-lower alkyl-$\Delta^1$-pyrroline.

5. A compound as defined in claim 1 of the formula 2-guanidino-3,3-diphenyl-5-methyl-$\Delta^1$-pyrroline.

6. A compound as defined in claim 1 of the formula 2-ureido-3,3-diphenyl-5-methyl-$\Delta^1$-pyrroline.

7. A compound as defined in claim 1 of the formula 2-guanidino-3,3-diphenyl-5-ethyl-$\Delta^1$-pyrroline.

8. A compound as defined in claim 1 of the formula 2-guanidino-3,3-diphenyl-5-butyl-$\Delta^1$-pyrroline.

9. A compound as defined in claim 1 of the formula 2-guanidino-3,3-diphenyl-5-isobutyl-$\Delta^1$-pyrroline.

10. A compound as defined in claim 1 of the formula 2-guanidino-3,3-diphenyl-5-hexyl-$\Delta^1$-pyrroline.

11. A compound as defined in claim 1 of the formula 2-guanidino-3,3-diphenyl-4,4-dilower alkyl-$\Delta^1$-pyrroline.

12. A compound as defined in claim 1 of the formula 2-guanidino-3-phenyl-3-cyclohexen-1'-yl-$\Delta^1$-pyrroline.

13. A compound as defined in claim 1 of the formula 2-thioureido-3,3-diphenyl-5-methyl-$\Delta^1$-pyrroline.

14. A compound as defined in claim 1 of the formula 2-thioureido-3,3-diphenyl-5-n-butyl-$\Delta^1$-pyrroline.

15. A compound as defined in claim 1 of the formula 2-guanidino-3,3-diphenyl-4,4-dilower alkyl-$\Delta^1$-pyrroline.

16. A compound as defined in claim 1 of the formula 2 - (N'-methoxymethyl)-thioureido-3,3-diphenyl-5-methyl-$\Delta^1$-pyrroline.

17. A compound as defined in claim 1 of the formula 2-(N'-dimethyl)-guanidino - 3,3 - diphenyl-5-methyl-$\Delta^1$-pyrroline.

18. A compound as defined in claim 1 of the formula 2-(N'-methoxymethyl) - thioureido - 3,3 - diphenyl-$\Delta^1$-pyrroline.

19. A compound as defined in claim 1 of the formula 2-(N'-diethylaminopropyl)-thioureido - 3,3 - diphenyl-5-methyl-$\Delta^1$-pyrroline.

20. A compound as defined in claim 1 of the formula 2-guanidino-3-phenyl-3-p-toluyl-$\Delta^1$-pyrroline.

21. A compound as defined in claim 1 of the formula 2-(N'-n-butyl) - thioureido - 3,3 - diphenyl-5-methyl-$\Delta^1$-pyrroline.

References Cited
UNITED STATES PATENTS
3,109,848  11/1963  Bortnick et al.

ALEX MAZEL, Primary Examiner
J. A. NARCAVAGE, Assistant Examiner

U.S. Cl. X.R.
260—310, 326.5, 326.9, 453, 465, 482; 424—274

UNITED STATES PATENT OFFICE
CERTIFICATE OF CORRECTION

Patent No. 3,564,010                    Dated February 16, 1971

Inventor(s) Bretschneider, Franzmair, Klotzer and Schmidt

It is certified that error appears in the above-identified patent and that said Letters Patent are hereby corrected as shown below:

Column 19, claim 1, lines 65-75:

"

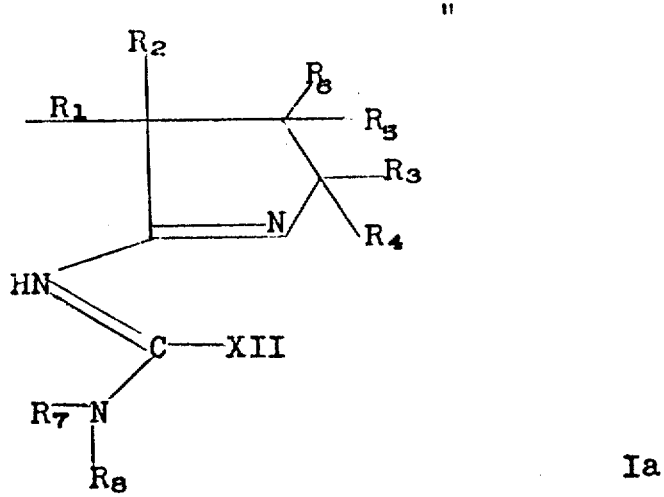

Ia

"

should be

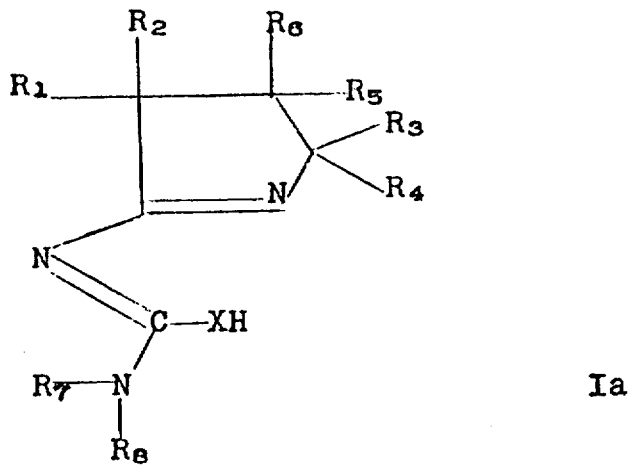

Ia

Signed and sealed this 26th day of October 1971.

(SEAL)
Attest:

EDWARD M. FLETCHER, JR.                    ROBERT GOTTSCHALK